(12) United States Patent
Saccomanno

(10) Patent No.: US 6,723,975 B2
(45) Date of Patent: Apr. 20, 2004

(54) SCANNER FOR AIRBORNE LASER SYSTEM

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 270 days.

(21) Appl. No.: 10/068,740

(22) Filed: Feb. 5, 2002

(65) Prior Publication Data

US 2002/0149761 A1 Oct. 17, 2002

Related U.S. Application Data

(60) Provisional application No. 60/266,939, filed on Feb. 7, 2001.

(51) Int. Cl.[7] ................ G01N 21/47; G01N 21/55; G01C 21/44
(52) U.S. Cl. .............. 250/203.6; 356/445; 356/338
(58) Field of Search ................ 356/337–343, 356/446; 359/212–215; 250/201.1, 203.1–203, 203.6

(56) References Cited

U.S. PATENT DOCUMENTS

| | | | |
|---|---|---|---|
| 3,781,552 A | * | 12/1973 | Kadrmas ............. 250/214 DC |
| 4,021,659 A | | 5/1977 | Wiley |
| 4,351,019 A | | 9/1982 | Avery et al. |
| 4,893,928 A | | 1/1990 | Knollenberg |
| 5,383,200 A | | 1/1995 | Barrett et al. |
| 5,519,209 A | | 5/1996 | Rapoport et al. |
| 5,673,139 A | | 9/1997 | Johnson |
| 5,702,654 A | | 12/1997 | Chen et al. |
| 5,751,465 A | * | 5/1998 | Melville et al. ............. 359/213 |
| 5,815,250 A | | 9/1998 | Thomson et al. |
| 5,920,417 A | | 7/1999 | Johnson |
| 5,942,157 A | | 8/1999 | Sutherland et al. |
| 5,942,343 A | | 8/1999 | Chen |
| 6,123,026 A | | 9/2000 | Gottlieb |
| 6,263,003 B1 | | 7/2001 | Huang et al. |

* cited by examiner

Primary Examiner—Zandra V. Smith
(74) Attorney, Agent, or Firm—Kurt Lother; James W. Falk

(57) ABSTRACT

A multi-axis laser scanner and receiver capable of providing laser scanning in multiple fields of view using a microscanner and a fold mirror with a patterned aperture. The fold mirror has a transmissive central region and a periphery that is reflective. Such scanners can be employed in a helicopter to scan in the forward field of view for obstacle detection, and in an upward field of view for air data measurements. Additional fields of view can be added, for example, to provide downward scans to detect height above terrain and ground speed.

12 Claims, 4 Drawing Sheets

SCANNER FOR AIRBORNE LASER SYSTEM

CROSS-REFERENCE TO RELATED APPLICATIONS

The following patent application hereby incorporates U.S. Provisional Application No. 60/266,939, filed Feb. 7, 2001 in its entirety as though filly and completely set forth herein.

FEDERALLY SPONSORED RESEARCH OR DEVELOPMENT

Not Applicable

BACKGROUND OF THE INVENTION

1. Technical Field

The present invention relates to the field of airborne laser systems, and more specifically, to a laser system that detects obstacles and gathers air data information such as three-axis airspeed.

2. Background Art

It is known that a controlled moving mirror mounted one or more rotating axes can be used repetitively deflect a laser beam in such applications as laser printers, bar code scanners, and Light Detection and Ranging (LIDAR) systems.

Recent advancements in microeletromechanical systems (MEMS) have shown the potential for a scanner-on-a-chip. For example, a two-axis MEMS scanner device has been developed semiconductor manufacturing processes and a commercially successful Digital Micromirror Device (DMD) is available from Texas Instruments (TI).

This type of device, having a mirror no larger than 1 cm in diameter, enables the development of a compact light detecting and ranging (LIDAR) system. LIDAR system operation is known in the art, and a further description of such system operation is not included herein.

LIDAR systems can be broadly characterized as vehicle-mounted or fixed-mounted (i.e. stationary). A significant difference between the two relates to the environmental requirements. For example, airborne systems must operate through more severe temperature, vibration, and other extremes as compared to the more benign environment of stationary systems.

Unique to an airborne optical system is the choice of window materials that must withstand the abrasion effects of high-speed air streams.

One prior art LIDAR-based obstacle detection system goes by the tradename HELLAS, sold by Dornier GmbH of Friedrichshafen, Germany. According to its specification sheet, it uses a 1.54 micron laser, an InGaAs APD hybrid detector, a fiber-optic scanner for the horizontal direction, and an oscillating mirror in the vertical direction, with a scanning frequency of 2~4 Hz. It does not contain an air data mode.

There is a long-felt need for a compact, low-weight, low-cost LIDAR system that provides both obstacle detection and air speed determination. Such a dual mode system would provide a great benefit, especially for helicopter systems, where low air speed detection is difficult to measure.

SUMMARY OF THE INVENTION

The present invention comprises a unique scanning system for a dual-mode LIDAR system that detects obstacles in a first field of view (FOV) and also provides air data information from a second FOV. For example, the first FOV could be along the flight path, and the second FOV, in the case of a helicopter, can be up through the rotor blades, in an axis substantially orthogonal to the first FOV. This example will be used throughout the specification, although one skilled in the art can realize many other applications, some of which may benefit from the two field of views (FOV) not being orthogonal. Advantageously, my invention is suitable for installation on piloted-helicopters and/or uninhabited air vehicles (UAV) where weight, size and cost are critical system attributes.

The air data mode-of-operation is enabled by incorporating a fold mirror with a patterned aperture placed at the output of a laser scanner, in the general shape of a picture-frame, having a clear aperture through which the forward obstacle scanning laser beam passes, and a periphery with a reflective coating for intercepting a portion of the scan, deflecting those portions upward for air data collection.

It is anticipated that other patterns can be employed, for example, reflective portions placed only at the four corners of the fold mirror. In a further embodiment, an array of reflecting prisms, lens elements, or other optics is placed around the periphery of the fold mirror to direct the beam into a complex pattern of scan angles. Advantageously, this feature may be useful to detect air data in multiple regions above the aircraft. Alternatively, a region of the periphery of the fold mirror can direct scans towards the ground to determine height above terrain, and ground speed. This then would define scan patterns exiting the optical enclosure in three axes (upward, forward, and downward). Additionally, the central clear aperture can be patterned with reflective dots, lenslets, or prisms, to further add degrees of scanning freedom. In other embodiments, the clear aperture is made partially reflective to allow for simultaneous scans in multiple fields of view.

Note that the laser as referenced herein can use either visible light or non-visible light, the latter typically based on infrared (IR) lasers, with the preferred IR lasers operating in the eye-safe region.

The invention, then, relates to the use of a microscanner and a stationary fold mirror with a patterned aperture for scanning more than one axis. This allows the high-cost laser to provide several functions, thereby reducing overall cost as compared to an aircraft employing multiple separate laser systems.

BRIEF DESCRIPTION OF DRAWINGS

Figure 1:
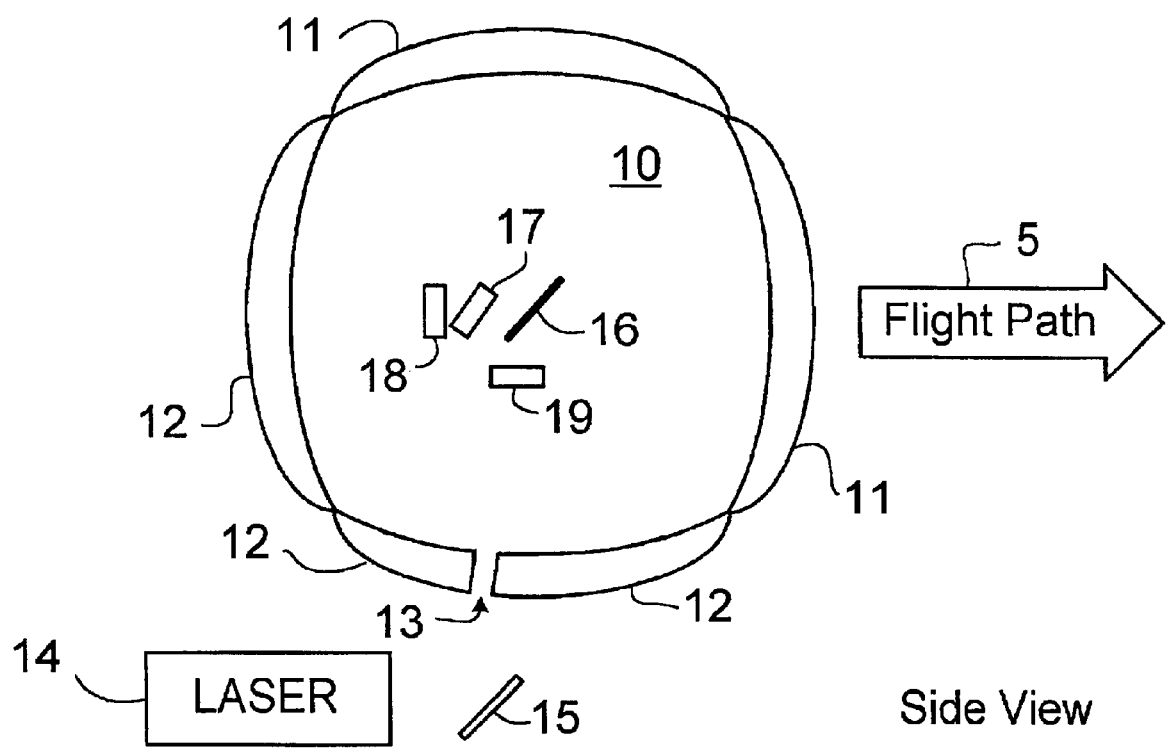

Brief Description of the Several Views of the Drawing

FIG. 1 depicts a side view of an airborne laser scanner in accordance with a first illustrative embodiment of my invention.

Figure 2:
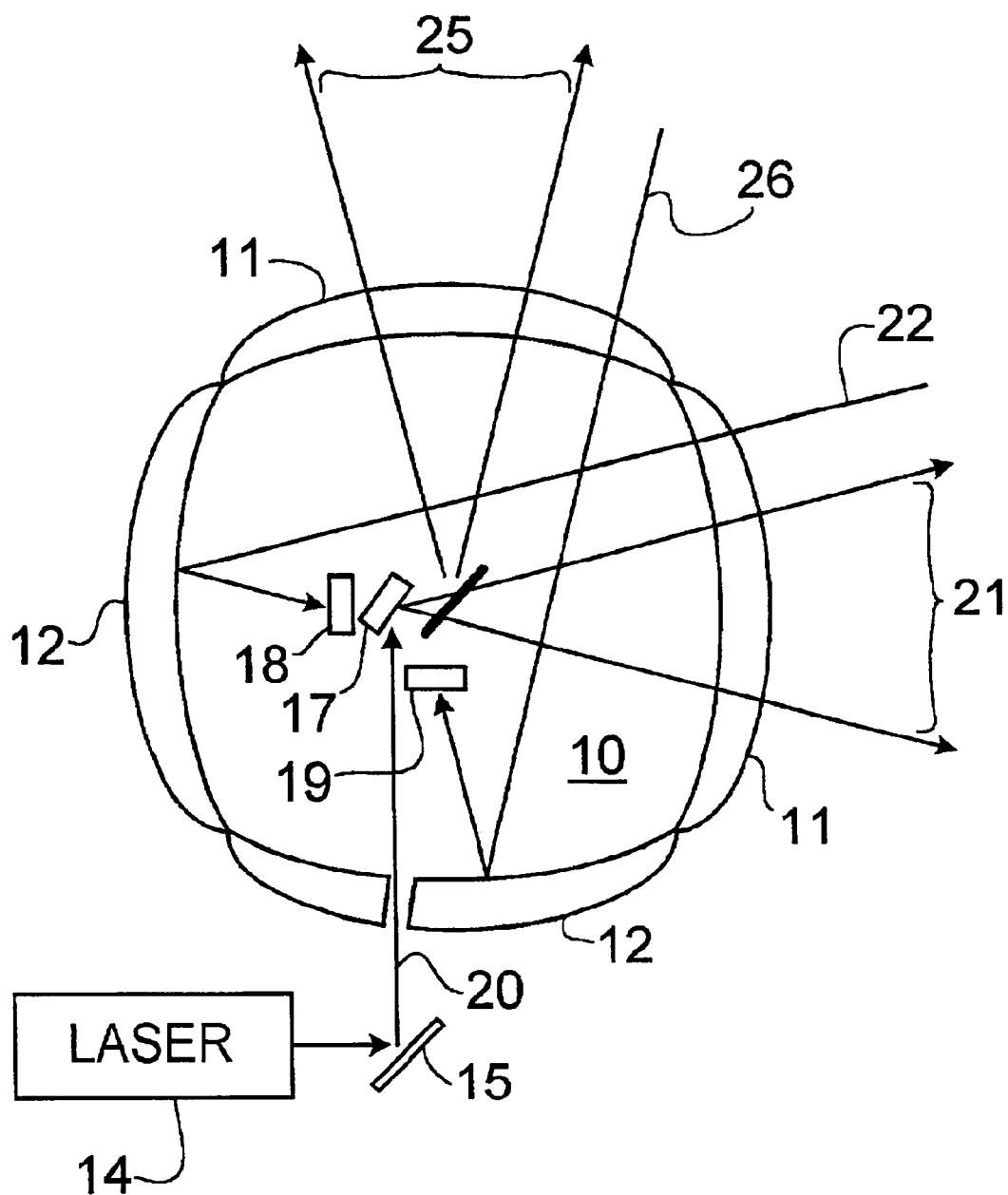

FIG. 2 depicts the airborne laser scanner of FIG. 1, further showing laser beams therewithin.

Figure 3:
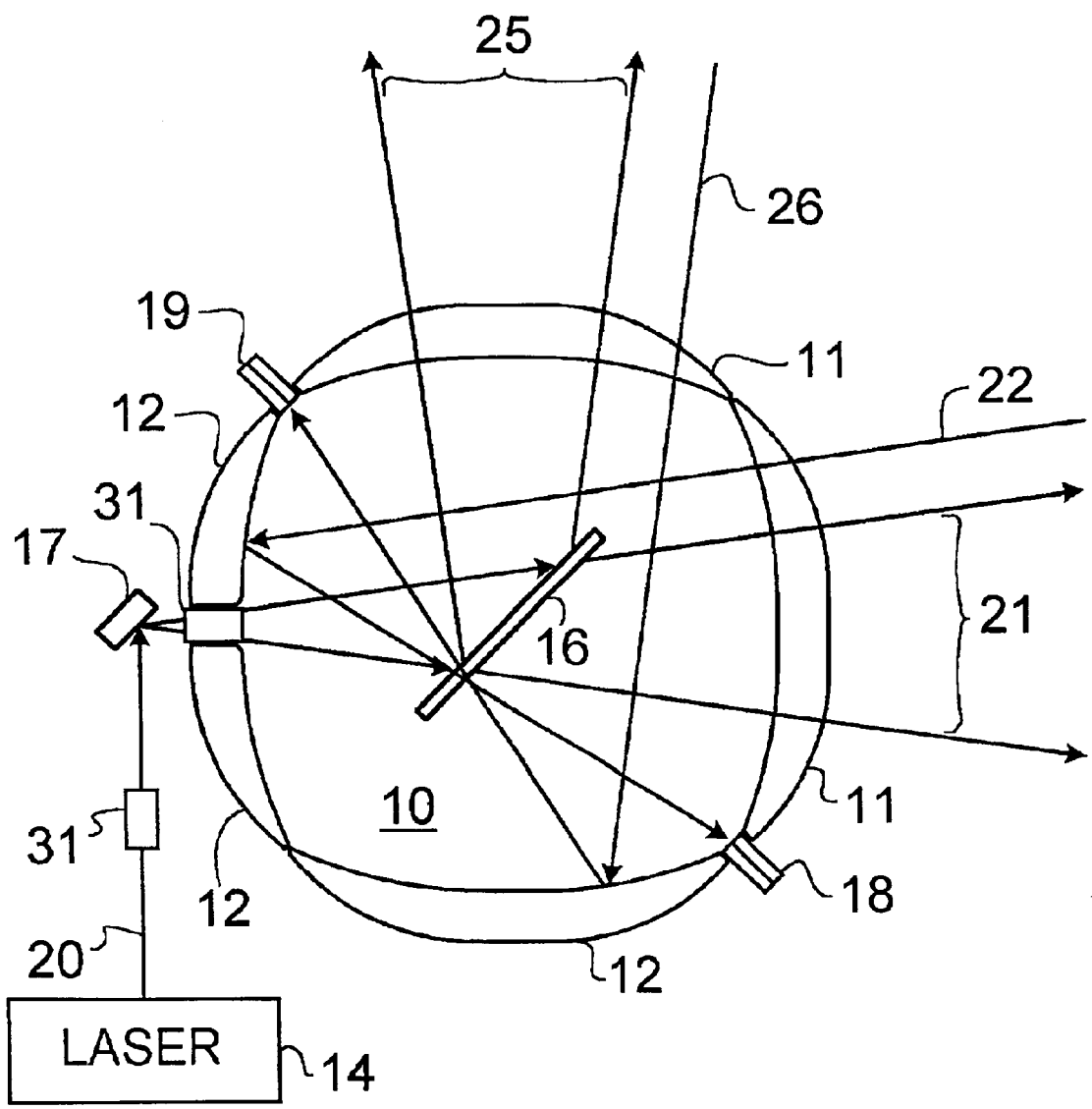

FIG. 3 depicts a side view of an airborne laser scanner in accordance with a second illustrative embodiment of my invention.

Figure 4:
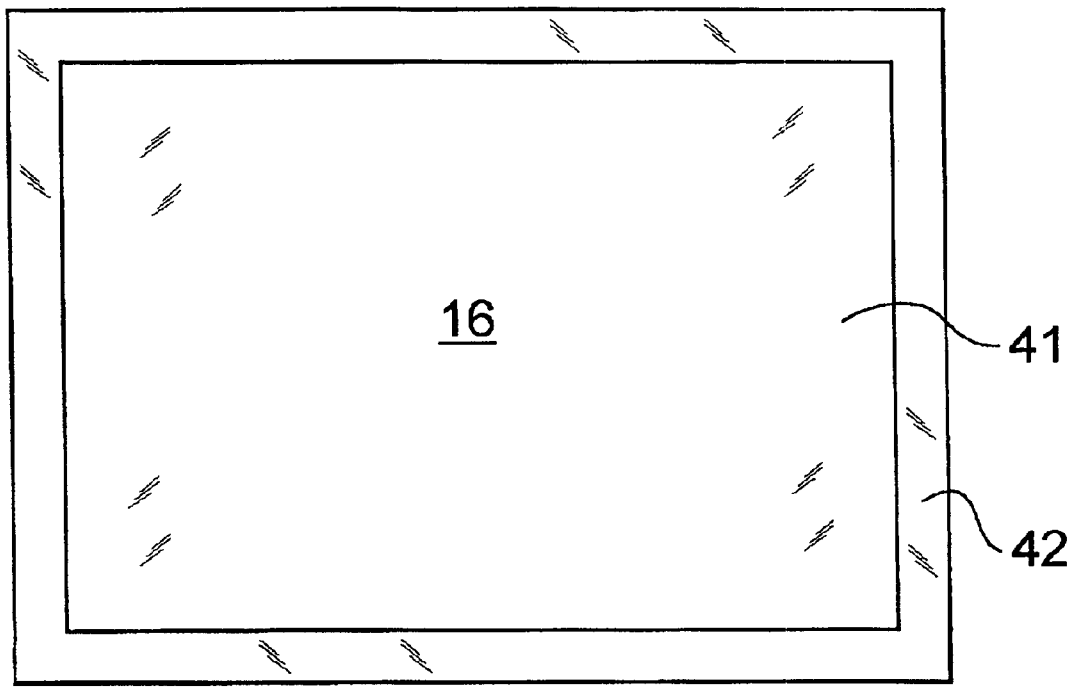

FIG. 4 depicts a patterned glass fold mirror, which can be used as a component of my invention.

Figure 5:
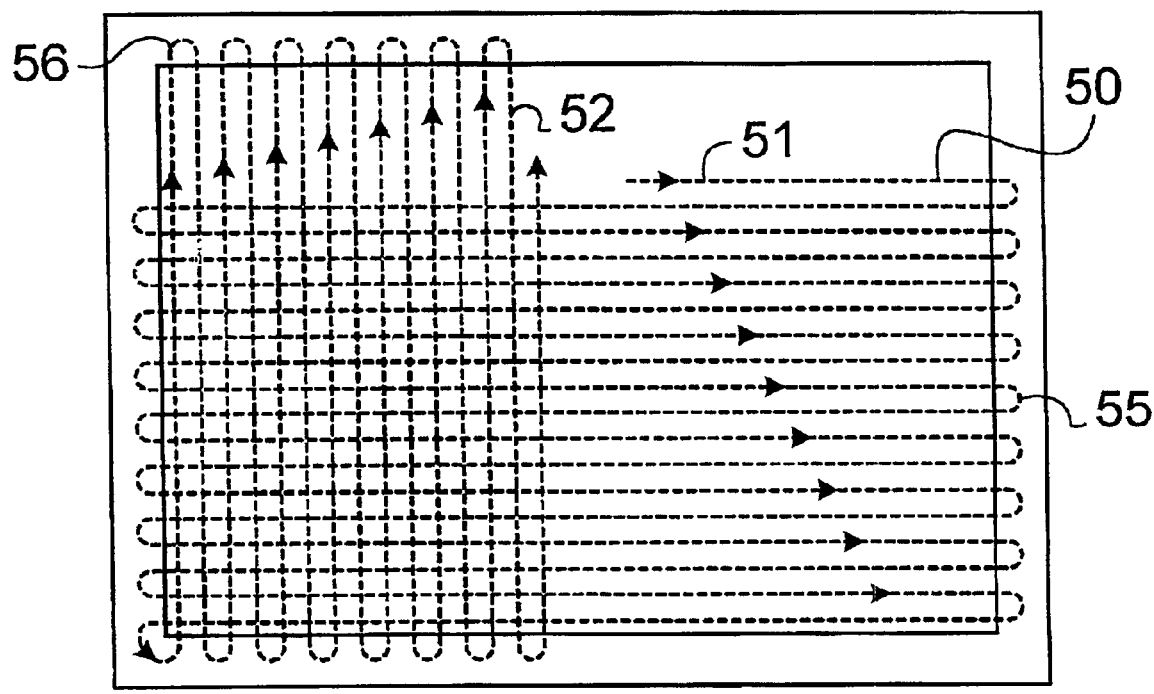

FIG. 5 depicts a laser scanning pattern superimposed on the patterned glass window of FIG. 4.

DETAILED DESCRIPTION OF THE INVENTION

Mode(s) for Carrying Out the Invention

Referring first to FIGS. 1 and 2, the components of an airborne optical laser scanner are shown. In order to more clearly point out certain features of my invention, the components of FIGS. 1 and 2 are not drawn to a precise scale. For example, the scanner, detectors, and fold mirror with patterned aperture will be very small compared to the size of the windows and condensing optical elements.

An optical enclosure 10 is formed by windows 11 and condensing optical elements 12. One of the condensing optical elements 12 includes an aperture 13, such as a hole drilled therethrough, so that a laser beam 20 can enter the optical enclosure 10. Components within the optical enclosure 10 include a microscanner such as a multiple-axis-scanning mirror 17, a first laser detector 18, a second laser detector 19 and a fold mirror with patterned aperture 16. Condensing optical element 12 having beam 22 striking thereof, as seen in FIG. 2, would have a shape maximizing the most amount of energy concentrated on detector 18. Similarly, condensing optical element 12 having beam 26 striking thereof would have a shape concentrating the most energy on detector 19. Note that condensing optical elements 12 can each be replaced by an array of elements, for example. Advantageously, this arrangement promotes compactness by virtue of shorter back focal lengths. This arrangement also provides enhanced signal to noise ratio (S/N) by application of signal processing techniques such as subtracting out the random- and/ or common-mode noise components between multiple detectors.

In embodiments using multiple detectors per condensing optical element 11, there is a reduction in collection due to shadowing effects that must be considered. In addition, increasing distances between adjacent detectors will result in reduced signal to noise ratio (S/N) due to the differences in local thermal and electromagnetic environments. One preferred embodiment configures condensing optical element 12 as an array of off-axis mirrors, each imaging the window 11 on a common focus at a large area detector or closely packed detector array such as tightly packed morphing non-imaging optics. In a further embodiment, each mirror of the array is physically canted towards its respective detector.

Shown external of the optical enclosure 10 is a laser source 14 positioned such that a laser beam 20 exiting from the laser source 14 is directed toward a fold mirror 15 and then reflected into the optical enclosure through aperture 13. Windows 11 can be spherical, or a flat plate, assuming the plate thickness does not degrade the S/N due to the differences in optical thickness as a function of beam angle.

Condensing optical element 12, shown in FIGS. 1, 2, and 3, are preferably designed to image the window aperture 11 onto one or more detectors. It is important to note that the detectors 18 and 19 are positioned in the figures for clarity and are not representative of the focal lengths required for a functional optical system. A functional optical system images the window, or at least an area through which a portion of the laser scatter returns pass, onto a small detector, and as-such, the focal lengths will need to accommodate a magnification of <1.0, constrained by the etendue of the detector(s).

Large windows 11 require large area detectors or even an array of detectors. Suitable detectors would be avalanche photodiodes (APD) and photomultiplier tubes (PMT), such as those available from Hamamatsu Corp. (Bridgewater, N.J.) or a hybrid APD/PMT available from Intevac (Santa Clara, Calif.). Note that the detectors must be matched to the laser wavelength, for example, those based on InGaAs to sense wavelengths in the 1–2 micron region As mentioned previously, the system includes either a single condensing optical element or a faceted mirror-array, such as a fresnel or micro-optic surface where each facet images the window aperture, or a section of it, onto its respective detector. These optical elements can be fabricated in plastic, glass), or metal.

Alternatively, the mirror can be comprised of microelectromechanical systems (MEMS) array of active mirrors, similar in construction to the Texas Instruments DMD, but employing additional degrees of freedom. Such a system can dynamically provide the best collection efficiency as a function of the desired obstacle and target range, its reflectance characteristics along with the current position of the scanned beam. Alternatively, holographic optical elements (HOE) can be employed in place of the condensing optical elements to concentrate the collected energy on one or more detectors. This may be especially suitable for LIDAR systems having a return-signature compatible with the optical power limitations of HOE. For a wide field of view (FOV) (e.g. 40° horizontal×20° vertical), an electrically switchable holographic optical element (ESHOE) can be employed. The ESHOE could be synchronized with the scanner, and so when the scanner is directed towards the left-half of the FOV (i.e. –20° horizontal to 0° horizontal), one ESHOE is switched-in, and when the scanner is directed towards the right-half of the FOV (i.e. H0° to H+20°), the other ESHOE is switched-in. At either switch setting, the inactive ESHOE becomes essentially transparent.

In another embodiment, the condensing optical elements can be removed and simply replaced by an array of detectors, either off the shelf devices or those coupled with additional optics (e.g. non-imaging concentrators) to enhance collection efficiency at the laser wavelength(s), thereby improving S/N. In fact, the detector arrays can be placed within the enclosure and behind the windows, outside of the FOV of the scanner as it passes through the windows. In any of the multi-detector arrangements, there is necessarily a trade between a smaller number of detectors with a large collection optic and a larger number of detectors, each with its own collection optic (which can be as simple as the lens that comes already attached to off-the-shelf diode detectors).

Note that the design of reflective optical systems is known in the art. Such an optical system can be optimized by using, for example, CODE V by Optical Research Associates (Pasadena, Calif. a software package that aids in optical design, analysis, illumination calculations, and fabrication support.

Additional imaging, non-imaging, and holographic optical elements can be added to further improve S/N. For example, a non-imaging concentrator can be used in front of detectors 18 and 19 to match the etendue of the received beams 22 and 26, respectively, as reflector off mirrors 12.

FIG. 4 depicts a patterned glass mirror 16 having a transmissive portion 41 and a reflective portion 42. In FIG. 5, the laser beam configuration within the optical enclosure 5 is shown. After the laser beam 20 enters the optical enclosure 10, it is directed into the multiple-axis scanning mirror 17, which causes the laser beam to sweep through a predefined laser scan pattern 50. The laser scan pattern 50 passes through the fold mirror with patterned aperture 16 and a first portion of laser scan pattern 21 is transmitted out of the optical enclosure 10, through a first one of the windows 11, along the aircraft flight path 5. A second portion of laser scan pattern 21 is reflected upward from the fold mirror with patterned aperture 16 and transmitted out of the optical enclosure 10, through a second one of the windows 11, perpendicular to the aircraft flight path 5.

The upward beam 25 is used to detect the motion of aerosol particles, where such motion may be useful in determining the airspeed of the host aircraft.

In the present invention, a small portion of the upward directed beam 26 is reflected from these aerosol particles and reenters the optical enclosure where it is reflected off the condensing optical element surface 12 and is directed to the first laser detector 19. As mentioned previously, multiple mirror surfaces, along with their respective detectors may be employed as well. Typically, the aerosol measurements need only consider three points in space to determine a geometric plane defining the relative airspeed. Fold mirror with patterned aperture 16 provides many additional data points and can, therefore, be shaped to concentrate more energy at three spots, while still providing a transmissive area 41 to allow for the forward beam to pass therethrough.

The forward beam 21 is used to detect obstacles, such as wires, that may be present in front of the aircraft at various ranges. A portion of the forward directed beam 22 is reflected from these obstacles and renters the optical enclosure where it is reflected off the mirror 12 surface and is directed to the second laser detector 18. Unlike the upward beam, the forward beam must be scanned over some solid angle, generally referred to as the field-of-view (FOV), requiring the highest accuracy measurements, and a surrounding field-of-regard (FOR), the latter being less demanding. The MEMS scanner must be able to accommodate these deflection angles, along with the requisite deflection speeds that are driven by the desired update rate.

Another advantage of a MEMS approach is that the mirror element has extremely low mass, and thus higher accelerations are achievable at lower power levels than with traditional electromechanical scanners. Should the scanner not have the desired FOV/FOR, then an additional beam deflector would be required. For example, a negative lens, or even a lens array, can be included in the transmissive portion 41 of fold mirror with patterned aperture 16.

FIG. 5 details the scan direction superimposed on fold mirror with patterned aperture 16 that is reflective in certain areas 42 for deflecting the scan to collect air data and transmissive in area 41 for obstacle detection scanning. A preferred embodiment uses the energy contained within the beam turnaround zones 55 and 56 for the air data scans, since this energy may not be useful used for terrain scanning. In one embodiment, the fold mirror with patterned aperture comprises a hole in a mirrored plate. Alternatively, a patterned glass window is employed, where such patterned glass window is manufactured using large area thin film deposition equipment, such as those at Thin Film Devices Inc. (Anaheim, Calif.), or Photo Sciences (Torrance, Calif.). In either embodiment, the fold mirror with patterned aperture 16 is designed to transmit and reflect the specific laser wavelength.

Another preferred embodiment employs an ESHOE for the fold mirror with patterned aperture, thereby allowing different modes of operation to be switched-in depending upon the situation. For example, during a helicopter take-off, an ESHOE can be activated to provide forward scanning for wire detection and upward scanning for low-speed air data. During high-speed nap-of-the-earth flying, a different ESHOE is switched-in, providing forward scanning for obstacle detection (including wires) and downward scanning for height-above-terrain and ground speed measurements. As discussed previously, the ESHOE that is disabled is essentially transparent. A typical ESHOE is manufactured by Digilens (Sunnyvale, Calif.). It is also important to note that if a holographic optical element (HOE) is used, then the fold-mirror need not be tilted as required by a simple fold mirror due to the optical power provided by the hologram.

FIG. 3 shows a second embodiment of my invention where the scanner 17 and the laser detectors 18 and 19 are located external to optical enclosure 10. Advantageously, this optical arrangement allows beam expansion optics 31, such as those known in the art, to be positioned in the light path of the laser beam 20. The interaction of the laser beam 20, the fold mirror 16, and the laser detectors 18 and 19 is as described previously.

It should be noted that when the beam expansion optics 31 are positioned before the scanner mirror 17, then the scanner mirror must accommodate a larger beam size. A more collimated beam is advantageous as the range being sensed increases in distance because it places more laser energy on potential obstacles and targets. Systems using this more collimated beam are more complex, thereby increasing system cost and weight, and sacrificing some reliability. As brighter and more efficient lasers become available, microscanners with minimal beam expansion can be used without additional optics. In one embodiment, a high-power cladding-pumped broadband fiber source is used as the laser source.

In alternate embodiments, the optical system can be can be rotated 45 degrees to provide diagonal scanning patterns instead of horizontal and vertical scanning patterns. The scanner can also be programmed to provide any other type of scan pattern (circular, elliptical, etc).

Further embodiments may be devised without departing from the spirit or the scope of the invention. For example, should wire detection not be of interest, the forward laser pattern can be used for targeting, range detection, active night vision imaging, and the like.

List of Acronyms used in the Specification

The following is a list of the acronyms used in the specification in alphabetical order.

| | |
|---|---|
| APD | avalanche photodiode |
| DMD | Digital Micromirror Device (Texas Instruments Inc.) |
| ESHOE | electrically switchable holographic optical element |
| FOR | field of regard |
| FOV | field of view |
| HOE | holographic optical element |
| InGaAs | Indium Gallium Arsenide |
| IR | infrared (portion of electromagnetic spectrum) |
| LIDAR | light detecting and ranging |
| MEMS | microeletromechanical systems |
| PMT | photomultiplier tube |
| S/N | signal to noise ratio |
| UAV | uninhabited air vehicle |

What is claimed is:

1. An apparatus for directing laser energy to a plurality of targets in multiple fields of view, and receiving the scattered returns therefrom, comprising:

a plurality of condensing optical elements for collecting said scattered returns;

a plurality of windows for allowing said laser energy to pass therethrough;

an optical enclosure being formed from a combination of said condensing optical elements and said windows;

a multiple-axis scanning mirror positioned to receive a laser beam, said multiple-axis scanning mirror directing said laser beam into one or more predetermined scan patterns; and a fold mirror with patterned aperture positioned to intercept the laser scan pattern, from said scanning mirror, said fold mirror directing a first portion of said laser scan pattern along a first field of view and a second portion of said laser scan pattern along a second field of view.

2. The apparatus in accordance with claim 1 wherein said multiple-axis scanning mirror is located within said optical enclosure and receives said laser beam through an aperture in said optical enclosure.

3. The apparatus in accordance with claim 1 wherein said fold mirror further comprises:

a transmissive central region passing said first portion of said laser scan pattern therethrough; and a periphery deflecting said second portion of said laser scan pattern in a direction along said second field of view.

4. The apparatus in accordance with claim 1 further comprising a plurality of detectors, each detector converting said scattered returns collected from a respective condensing optical element into electrical signals.

5. The apparatus of claim 1 wherein said condensing optical element is selected from the group consisting of imaging optical elements, non-imaging optical elements, reflective optical elements, refractive optical elements, diffractive optical elements, and holographic optical elements.

6. The apparatus of claim 1 wherein said periphery includes a light directing element selected from the group consisting of reflective elements, refractive elements, diffractive elements, and holographic elements.

7. The apparatus of claim 3 wherein said transmissive central region is selected from the group consisting of a physical hole, a holographic element, a partially-transparent refractive element, and a substantially-transparent refractive element.

8. The apparatus of claim 1 wherein said fold mirror is tilted at a predetermined angle with respect to the laser energy from said scanning mirror.

9. The apparatus of claim 8 wherein said fold mirror with patterned aperture comprises a plurality of holographic optical elements.

10. The apparatus of claim 8 wherein said fold mirror with patterned aperture comprises one or more electrically switchable holographic optical elements.

11. A laser scanner for directing laser energy to a plurality of targets in multiple fields of view, and receiving the scattered returns therefrom, comprising:

a plurality of condensing optical elements for collecting said scattered returns, a plurality of windows for allowing said laser energy to pass therethrough;

an optical enclosure being formed from a combination of said condensing optical elements and said windows;

a multiple-axis scanning mirror located external to said optical enclosure and positioned to receive a laser beam, said multiple-axis scanning mirror directing said laser beam through an aperture into said optical enclosure and forming a laser scan pattern therefrom;

a fold mirror with patterned aperture located within said optical enclosure and positioned to intercept the laser scan pattern, said fold mirror comprising, a transmissive central region passing a first portion of said laser scan pattern therethrough in a direction substantially along a first field of view, and a periphery deflecting a second portion of said laser scan pattern in a direction along a second field of view; and a plurality of detectors, each detector located proximal to said optical enclosure to convert said scattered returns collected from a respective condensing optical element into electrical signals.

12. The laser scanner of claim 11 further comprising beam expansion optics.

* * * * *